United States Patent [19]
DeNigris, Jr.

[11] Patent Number: 4,998,185
[45] Date of Patent: Mar. 5, 1991

[54] MULTI-PURPOSE NAVIGATION BOARD

[76] Inventor: Michael J. DeNigris, Jr., 21 Lake St., White Plains, N.Y. 10603

[21] Appl. No.: 401,009

[22] Filed: Aug. 30, 1989

[51] Int. Cl.⁵ .............................................. F21V 33/00
[52] U.S. Cl. ...................................... 362/98; 362/103; 362/62; 248/444; 108/43
[58] Field of Search .................... 362/98, 99, 103, 105, 362/253, 190, 191, 61, 62; 248/444.1, 444; 224/273, 276, 277; 108/43

[56] References Cited

U.S. PATENT DOCUMENTS

| | | | |
|---|---|---|---|
| 544,684 | 8/1895 | Parker | 402/4 |
| 1,407,239 | 2/1922 | Weiss | 281/51 |
| 1,930,478 | 10/1933 | Jones | 235/615 |
| 2,263,154 | 11/1941 | Witting | 248/444 |
| 2,481,107 | 9/1949 | Gore | 248/444 |
| 2,527,216 | 10/1950 | Harris | 281/45 |
| 2,603,896 | 7/1952 | Bennett | 362/99 |
| 2,650,836 | 9/1953 | Berman | 362/98 |
| 2,661,222 | 12/1953 | Wolfe | 281/51 |
| 2,701,173 | 2/1955 | Senior | 108/43 |
| 2,791,040 | 5/1957 | Santorelli | 434/150 |
| 3,215,453 | 11/1965 | Malcom, Jr. | 362/103 |
| 3,232,685 | 2/1966 | Wilstein et al. | 362/103 |
| 3,791,314 | 2/1974 | Berretta | 108/43 |
| 3,808,415 | 4/1974 | Hurst | 362/103 |
| 4,103,809 | 8/1978 | Frost | 224/222 |
| 4,243,249 | 1/1981 | Goss | 281/51 |

OTHER PUBLICATIONS

Sportmans's Market, Inc., *Sporty's Pilot Sop*, Jun. Thru Sep. 1989 Catalog, 1989, Cover and pp. (9-11).

*Primary Examiner*—Stephen F. Husar
*Assistant Examiner*—D. M. Cox
*Attorney, Agent, or Firm*—Aufrichtig, Stein & Aufrichtig

[57] ABSTRACT

A navigation board for use by a rider in a vehicle, such as an airplane, with a steering mechanism. The navigation board supports a navigational aid. A first attachment mechanism, coupled to the board, is adapted to secure the board to the rider's leg. A second attachment mechanism, also coupled to the board, is adapted to secure the board to the steering mechanism. The navigation board is secured to either the rider's leg or the steering mechanism by one of the first and second atachment mechanisms to allow ready and convenient reference to the navigation aid by the user. The navigation board is secured to the steering mechanism with a three-point mounting system.

26 Claims, 2 Drawing Sheets

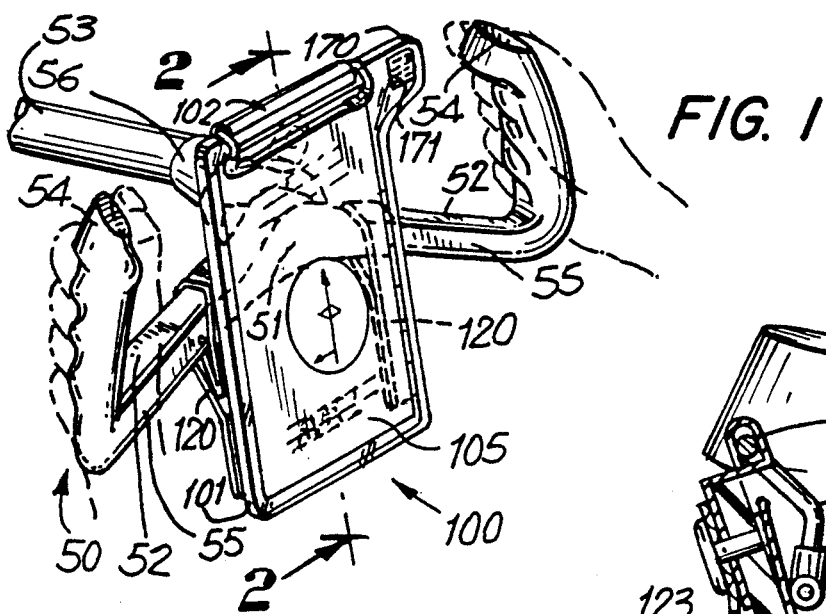
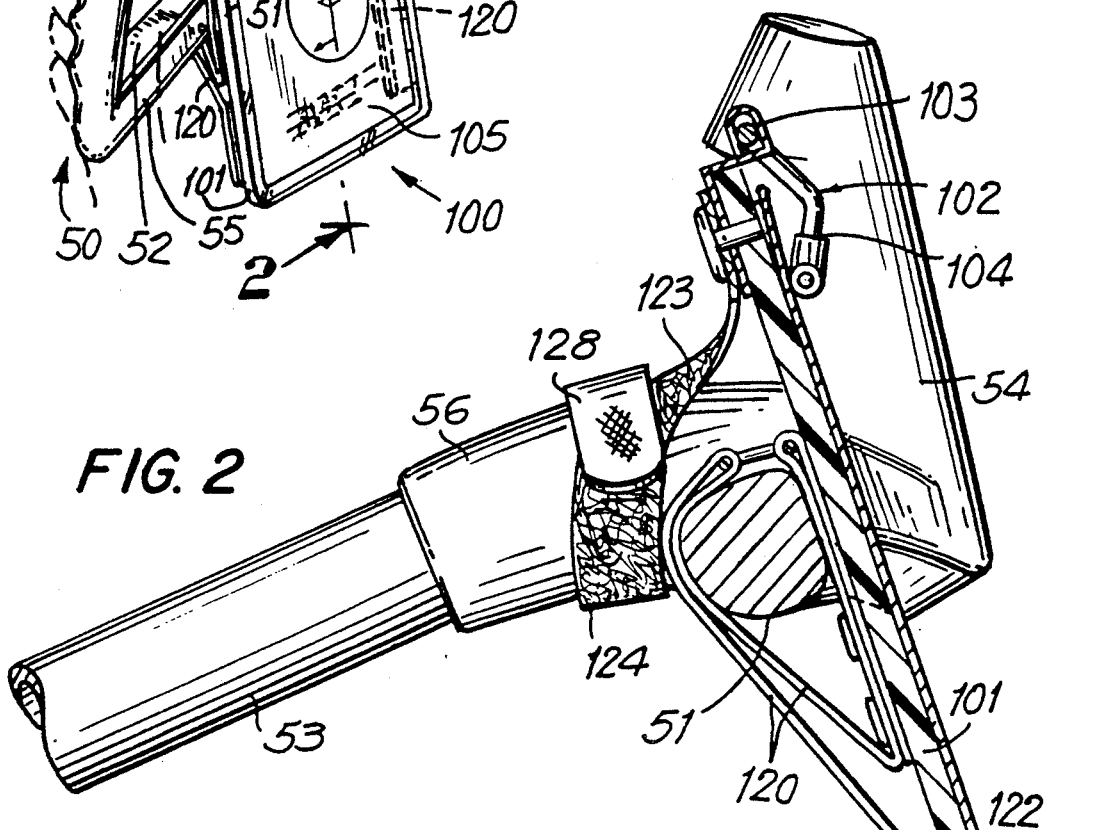
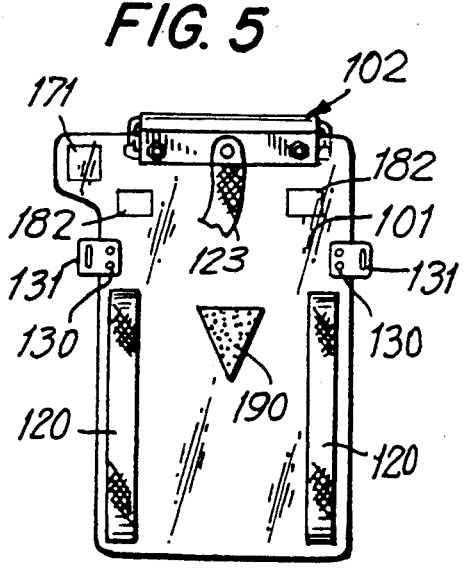
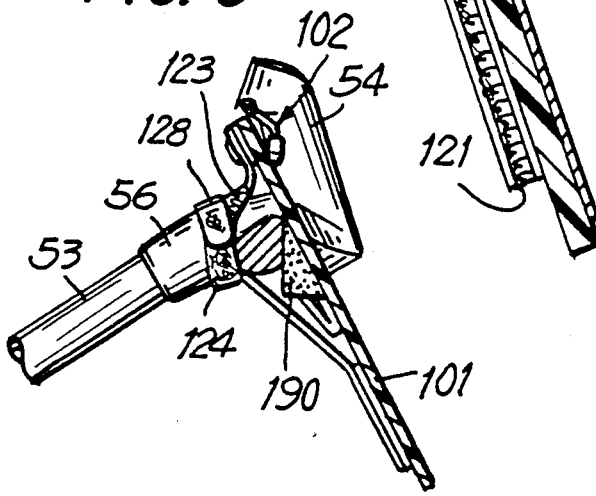

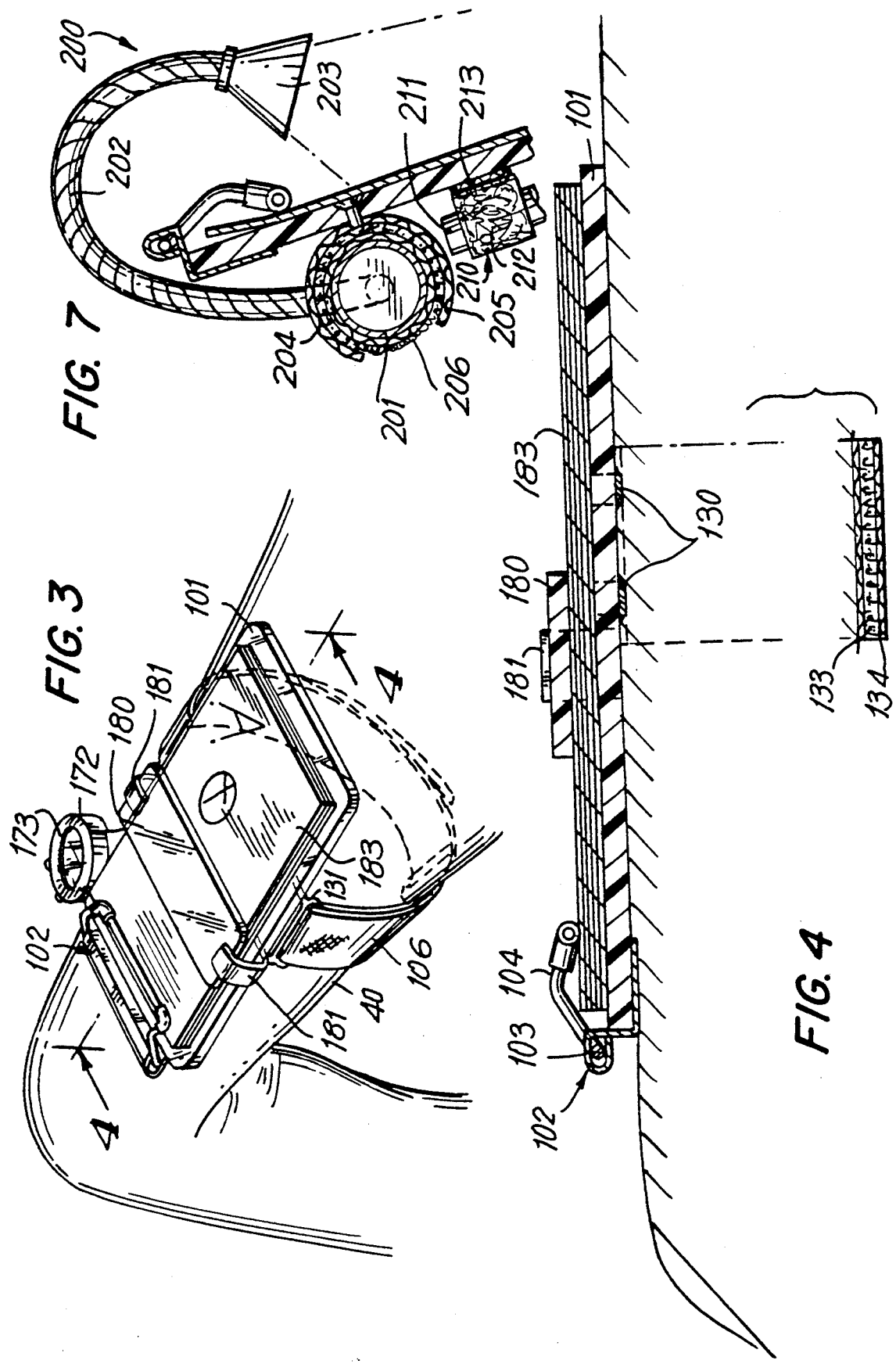

MULTI-PURPOSE NAVIGATION BOARD

BACKGROUND OF THE INVENTION

The invention is generally directed to a multi-purpose navigation board for placing essential navigation information at an airplane or helicopter pilot's quick and convenient access. The invention is specifically directed to a multi-purpose navigation board useful in airplanes, helicopters, and other vehicles, with suitable mechanisms for attaching the navigation board to either the wearer's leg or to the steering wheel, control yoke, or other steering member.

Lap boards are well known in the art and in the aviation field for maintaining navigation information essential to the steering and landing of airplanes and helicopters. Generally, information relating to radio frequencies, landing approaches, control tower signals, and other navigation information essential to the safe operation of aircraft in and around different airports is essential to safe flying. This information is not properly trusted to the pilot's or navigator's memory. Accordingly, either map sheets or map books must be utilized and maintained in close proximity to the pilot or navigator for ready reference at the appropriate times.

The aviation industry has developed a series of "lap boards" which are designed to be worn on the upper leg. These lap boards serve a useful function. However, due to the configuration of some cockpits, it is impractical and awkward to wear a lap board. The awkwardness is often due to the placement of the control yoke or steering wheel in relation to the pilot's or navigator's upper leg. In addition, the use of a lap board requires the pilot to look downward, away from the flight instrument and windshield areas, which under certain flying conditions, is undesirable and dangerous. Accordingly, there is a need for an improved multi-purpose navigation board.

SUMMARY OF THE INVENTION

The invention is generally directed to a navigation board for use by a rider in a vehicle with a steering mechanism. A board member supports a navigation aid. A first attachment mechanism, coupled to the board member, secures the board member to the rider's leg. A second attachment mechanism, coupled to the board member, secures the board member to the steering mechanism. The navigation board is secured to either the rider's leg or the steering mechanism for ready and convenient reference to the navigation aid by the rider.

Accordingly, it is an object of the instant invention to provide an improved multi-purpose navigation board.

Another object of the invention is to provide an improved multi-purpose navigation board adapted to be coupled either to the wearer's upper leg or to the steering wheel or control yoke.

A further object of the invention is to provide an improved multi-purpose navigation board adapted to be coupled to the steering mechanism by a three-point mounting system including two straps on the steering wheel or yoke and one on the steering column.

Yet another object of the invention is to provide an improved multi-purpose navigation board including an integral pad for securing a clock mechanism to the navigation board in close proximity to the rider's hand for easy operation when riders hands are on or near controls as they should be and; to place clock mechanism in plain view of the rider when rider's line of sight is directed to the instruments.

Still another object of the invention is to provide an improved multi-purpose navigation board including coupling members for holding either single map pages or a navigation map book open to a desired page.

Still a further object of the invention is to provide an improved multi-purpose navigation board wherein the board is formed of a material, such as plexiglass, which allows the user to write desired information on the board itself with a grease pencil, which markings may be later easily removed.

Yet a further object of the invention is to provide an improved multi-purpose navigation board in which the attachment of the navigation board to the steering wheel is angled by use of an angling member attached to the back of the navigation board so as to provide a more desirable angle of the navigation board.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a multi-purpose navigation board attached to a steering wheel in accordance with a preferred embodiment of the invention;

FIG. 2 is a cross-sectional view taken along line 2—2 of FIG. 1;

FIG. 3 is a perspective view of the multi-purpose navigation board of FIG. 1 in accordance with a preferred embodiment of the invention, attached to a wearer's leg;

FIG. 4 is a cross-sectional view taken along line 4—4 of FIG. 3;

FIG. 5 is a bottom elevational view of a multi-purpose navigation board in accordance with another preferred embodiment of the invention; and FIG. 6 is a cross-sectional view taken along line 2—2 of FIG. 1 of the multi-purpose navigation board of FIG. 5 secured to a steering wheel.

FIG. 7 is a side-elevational view of a multi-purpose navigation board in accordance with a further preferred embodiment.

DETAILED DESCRIPTION OF THE PREFERRED EMBODIMENTS

Reference is made to FIGS. 1-4 wherein a navigation board, generally indicated as 100, constructed in accordance with a preferred embodiment of the invention is depicted. Navigation board 100 includes a board 101, retaining clip assembly 102 including spring 103 and retaining arm 104. Retaining clip assembly 102 is adapted to hold a navigation sheet 105 or a navigation sheet book 183 (FIG. 3). In a preferred embodiment board 101 is formed of a unitary acrylic or other hard, clear plastic material. Board 101 is sized so as to hold a standard approach chart for U.S. governmental (NOS) instrument approach plate books 183 (page 3).

The navigation board is adapted to be secured either to the steering wheel, generally indicated as 50 or a wearer's leg 40. Steering wheel 50 includes a central yoke portion 51 and left and right horns 52 including handle portions 54 for gripping by a pilot's fingers and thumbs and generally horizontal portions 55. Yoke 51 is coupled to the steering mechanism through a steering column 53. Steering column 53 is coupled to steering wheel 50 at a steering column position 56 which may be considered a part of steering column 53. Generally, handle portions 54 are generally vertically oriented and steering column 53 and steering column portion 56 are generally horizontally oriented. The front surface of yoke 51, depending upon the type of steering wheel 50, can take on a variety of different shapes, orientations, and sizes. Yoke 51 shown in FIGS. 1 and 2 has a generally vertical orientation but is of relatively small size. Some airplane steering wheels, however, have massive yoke portions, some of which are vertically oriented while others are angled toward the steering column.

Board 101 has various straps and connectors coupled to its rear surface. A thigh strap 106 is coupled to two connector mechanisms 131 riveted to the bottom of board 101 with rivets 130. Rivets 130 hold connectors 131 which in a preferred embodiment are single or double looped connectors. A broad elasticized band 106 is threaded through connectors 131. Hook and pile connectors 133, 134 are coupled near the free ends of band 106.

To secure navigation board 100 to wearer's leg 40, as shown in FIGS. 3 and 4, the free ends of band 106 are stretched around the wearer's thigh and when suitable tension is present in band 106, the hook and pile connectors 133, 134 are mated so as to retain band 106 in its stretched state which serves to securely but comfortably maintain navigation board 100 on the wearer's thigh for easy reference and writing.

Reference is next made to FIGS. 1 and 2 wherein the connector straps and attachment mechanisms for securing board 101 to steering wheel 50 is depicted. For ease of explanation, FIGS. 1 and 2 are shown without thigh strap 106 or the connection hardware associated therewith. This is done for simplicity of presentation and clarity of the drawings. In a preferred embodiment, however, navigation board 100 is adapted to be freely coupled to either the wearer's thigh 40 or to steering wheel 50 and includes the mounting equipment for mounting on wearer's thigh 40 and steering wheel 50.

In a preferred embodiment board 101 is securely attached to steering wheel 50 with a three-point attachment system. Two straps 120 are coupled to the rear surface of board 101. In a preferred embodiment, a first end of straps 120 is riveted or otherwise affixed parallel and proximate to one of the side edges of the rear side of board 101. The second, free end of each of straps 120 includes a hook or pile connector 121 adapted to be mated with matching connectors 122. In addition, a third strap 123 is coupled to the rear of board 101 proximate the top of board 101. One surface of strap 123 has a pile connector 124 and the other surface of strap 123 has a hook connector 125. It is preferred that strap 106, used t secure board 101 to thigh 40, is removed when navigation board 100 is to be secured to the steering wheel 50. Strap 106 is designed in a preferred embodiment to be unthreaded from connectors 131. Strap 106 may however, stay attached if desired.

Board 101 is coupled to steering wheel 50 by wrapping straps 120 around the generally horizontal portion 55 of horns 52 on either side of yoke 51. After wrapping straps 120 around horns 52, the straps are securely fashioned in their tightened position by mating hook and pile connectors 121, 122. With both of the straps 120 securely fashioned about horns 52, board 101 is securely fastened to steering wheel 50.

To assure a more comfortable orientation for both reading and writing, strap 123 is wound around steering column 53 or steering column portion 56, as shown in FIG. 2, with mating hook and pile connectors 124, 125 serving to maintain strap 123 tightly in position around steering column 53 or steering column portion 56. As seen in FIG. 2, by utilizing strap 123, board 101 can be maintained at an angle to the vertical orientation comfortable for reading and writing. Generally, an angle between 5° and 75°, and preferably 15°–45°, is desirable. In addition, with the three-point mounting arrangement, board 101 is securely and positively retained in a convenient and useful orientation. The flexible three-point arrangement allows for attachment to a wide variety of different steering wheel mechanisms. Often, the distances between the handles 54 are narrower or wider, the circumference of horns 52 and the size and shape of yoke 51 vary from manufacturer to manufacturer. Straps 120 quickly and easily adapt to any size or shape horn 52, whether cylindrical, elliptical, or other cross-section. The attachment, regardless of the size or shape of horn 52 in a particular plane or other vehicle is the same. Strap 120 is wound around horn 52, pulled tight and then retained in place by mating hook and pile connectors 121, 122. Other releasable connectors may be used in place of hook and pile connectors. After both of straps 120 are securely fashioned to horns 52, strap 123 is wound around steering column 53 or steering column portion 56, as shown in FIG. 2, depending upon the actual structure of the particular steering wheel 50 to which navigation board 100 is to be coupled. While straps 120 securely fasten board 101 to horn 52, board 101, depending upon the structure of steering wheel 50 may have a tendency to rotate slightly about horn 52. However, when strap 123 is securely fastened with board 101 in its desired, angled orientation, board 101 is then securely fastened so as to maintain its position even under the pressure of a writing instrument or vibration when the plane or other vehicle is operating.

Straps 120, 123 are coupled to board 101 with rivets in a preferred embodiment. However, the straps may be coupled in a variety of other attachments, such as gluing, screwing, hook and pile connectors, mating members, and other approaches which assure that straps 120, 123 are firmly fixed to the back surface of board 101. The connection may be releasable, such as the use of hook and pile or other connectors, so that the straps utilized for the three-point mounting system can be removed when the navigation board 100 is utilized with strap 106 around the wearer's thigh 40. However, the various straps do not generally interfere with the operation of the navigation board when they are permanently attached to board 101.

Board 101, as noted above, is formed of a plexiglass or similar hard, clear material in a preferred embodiment. When board 101 is formed of a clear plexiglass, the pilot or the user of navigation board 100 can clearly easily and conveniently write information transmitted by the air traffic controller with a grease pencil onto board 101. Thereafter, the grease pencil writings can be quickly and easily erased from board 101. During flight, particularly solo or instrument flight, it is common and often necessary for the pilot and/or navigator to take down coordinates, radio frequencies, course and landing information received orally from the air traffic controller. Navigation board 100 provides a quick and convenient location to write the often critical information down conveniently and erasably.

Board 101 also includes an extended section 170 adapted to support a stop watch 173 or other timekeeping device. Portion 170, shown in FIGS. 1 and 3, is fitted with a hook or pile pad 171 which mates with a corresponding pad 172 on the bottom surface of stop watch 173. Navigation of an aircraft requires a strict and accurate monitoring of elapsed time between flight positions as well as total flying time on a regular and almost continuous basis. As such, portion 170 provides a conveniently located position for stopwatch/clock 173 (FIG. 3) which, when navigation board 100 is attached to steering wheel 50, does not require the pilot to substantially lower his eyes from either the instruments or the windshield.

By use of mating hook and pile connectors, stopwatch 173 can be easily removed and then reattached to board 101. This allows a pilot to utilize the stop watch he has previously been using on navigation board 100 and for increased flexibility of use and storage.

Often, rather than having a single NOS sheet, a pilot will have books of NOS approach maps. Rather than ripping out individual sheets and attaching them as shown in FIG. 1, a retaining bar 180 with straps 181 and mating hook and pile connector pads 182 can be used to hold the map book open to a desired page. Retaining bar 180 is, in a preferred embodiment, clear plexiglass rectangular member which rests on top of the open page of the map book. Straps 181 have a hook or pile connector pad on their free ends which mate with hook or pile connector pads 182 secured to the bottom surface of board 101. The retaining bar 180 may then easily be removed by separation of hook and pile connectors 182.

Reference is made to FIGS. 5 and 6, like elements being represented by like reference numerals. Some steering wheels 50 have massive or oddly shaped yokes 51 which prevent the angling of board 101 as desired, even with the use of strap 123. As such, in a preferred embodiment, a wedge shaped member 190 is removably secured to the bottom surface of board 101 by mating hook and pile connectors or other conventional means. Wedge shaped member 190, as shown in FIGS. 5 and 6, creates the desired angled orientation of board 101, even where steering wheel 50 includes a massive vertically oriented yoke 51.

Reference is next made to FIG. 7, like elements being represented by like reference numerals. To illuminate the navigation sheet, a light, generally indicated as 200 is used for low light conditions. Light 200 includes a generally cylindrical battery retaining portion 201, flexible goosenecked section 202 and lamp portion 203. Lamp 200 is secured to the back surface of board 101 by two straps 204. Straps 204 are attached proximate their centers to the rear or bottom surface of board 101. The free ends of straps 204 have mating hook connectors 205. Battery retaining portion 204 of lamp 200 has a mating pile connector 206 wrapped around its circumference at the two locations where straps 204 are designed to encircle battery retaining portion 204.

Lamp 200 is attached to board 101 by securing the mating hook and pile connectors 205 and 206 on straps 204 around battery retaining portion 201. Then, gooseneck portion 202 is adjusted so lamp portion 203 is suspended above the front or top of board 101 to shed light on the navigation materials supported on board 101. Even a small light placed as shown in FIG. 7 will illuminate the entire top surface of navigation board 101.

As also shown in FIG. 7, a grease pencil assembly, generally indicated as 210 may be releasably affixed to board 101 for ease of use and convenience. Grease pencil assembly 101 includes a grease pencil 211 with a strip of mating pile connector 212 around the circumference of pencil 211. Pile connection 212 is adapted to mate with a mating hook connector 213 which can be affixed to the top surface of board 101 or retaining bar 108 (FIGS. 3 and 4). In operation, the user merely presses grease pencil 211 against connector pad 213 so that mating hook and pile connectors 213, 214 mate to attach grease pencil 211 to board 101. To use pencil 211, the user merely pulls on pencil 211 to disengage hook and pile connectors 213, 214. In this way pencil 211 is always in a convenient location and easily accessible.

Navigation board 100 has been described with particular reference to its use in a fixed wing airplane. However, navigation board 100 is of equal use in a helicopter, car, truck, boat, or other navigable vehicles which use a steering wheel mechanism and requires ready and convenient access to navigational or other information.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A navigation board for use by a rider in a vehicle with a steering mechanism, comprising:
   board means for supporting a navigational aid;
   first attachment means, coupled to the board means, for securing the board means to the rider's leg;
   second attachment means, coupled to the board means, for securing the board means to the steering mechanism;
   whereby the navigation board is secured to one of the rider's leg and the steering mechanism for ready and convenient reference to the navigational aid by the rider.

2. The navigation board of claim 1 wherein the board means includes a board member having a top surface and a bottom surface, the top surface of the board member supporting the navigational aid.

3. The navigation board of claim 2 wherein the first attachment means comprises an elastic strap member adapted to be coupled to the bottom surface of the board member around the rider's leg.

4. The navigation board of claim 2 wherein the steering mechanism includes a steering member and an attached column and the second attachment means comprises first and second strap means coupled to the bottom surface of the board member, for securing the board member to the steering member and third strap means, coupled to the bottom surface of the board member for securing the board member to the steering mechanism column.

5. The navigation board of claim 1 further comprising navigation aid retaining means coupled to the board means for securing the navigational aid supported on the board means.

6. The navigation board of claim 5 wherein the navigational aid, retaining means includes a clamping member for holding the navigation aid.

7. The navigation board of claim 5 wherein the navigational aid retaining means comprises a retaining member, secured to the board means, for retaining a navigational aid in book form open to a selected page.

8. The navigation board of claim 1 further comprising angle adjusting means coupled to the board means for adjusting the angle of the navigation board and supported navigational aid relative to the rider, when the board means is attached to the steering mechanism.

9. The navigation board of claim 1 further comprising illumination means coupled to the board means for illuminating the navigational aid.

10. The navigation board of claim 1 further comprising writing means, releasably coupled to the board means for erasably writing on the board means.

11. A navigation board for use by a rider in a vehicle with a steering mechanism including a steering member and an attached steering column, comprising:
  board means for supporting a navigational aid, said board means having a top and a bottom surface, the top surface supporting the navigational aid; and
  mounting means, coupled to the board means, for securely mounting the board means to the steering mechanism, the mounting means including first and second strap means, coupled to the board means, for securing the board means to the steering member and third strap means coupled to the board means for securing the board means to the steering column;
  whereby the first, second, and third strap means act as a three-point mounting system to securely position the navigational aid supported on the board means proximate the steering member for easy reference by the rider.

12. The navigation board of claim 11 further comprising navigation aid retaining means coupled to the board means for securing the navigational aid supported on the board means.

13. The navigation board of claim 12 wherein the navigational aid, retaining means includes a clamping member for holding the navigation aid.

14. The navigation board of claim 12 wherein the navigational aid retaining means comprises a retaining member, secured to the board means, for retaining a navigational aid in book form open to a selected page.

15. The navigation board of claim 11 further comprising angle adjusting means coupled to the board means for adjusting the angle of the navigation board and supported navigational aid relative to the rider, when the board means is attached to the steering mechanism.

16. The navigation board of claim 11 further comprising illumination means coupled to the board means for illuminating the navigational aid.

17. The navigation board of claim 11 further comprising writing means, releasably coupled to the board means for erasably writing on the board means.

18. A navigation board for use by a rider in a vehicle with a steering mechanism including a steering member and an attached steering column, comprising:
  board means for supporting a navigational aid, said board means having a top and a bottom surface, the top surface supporting the navigational aid; and
  mounting means, coupled to the board means, for securely mounting the board means to the steering mechanism, the mounting means including first and second strap means, coupled to the board means, for securing the board means to the steering mechanism, each of the first and second strap means being flexible members a free end of each of said first and second strap means adapted to encircle respective portions of the steering member and adapted to be secured to the bottom surface of the board means to maintain such encirclement;
  whereby the first and second strap means act as a two-point mounting system to securely position the navigational aid supported on the board means proximate the steering member for easy reference by the rider.

19. The navigation board of claim 18 further comprising attachment means coupled to the board means for securing the board means to the rider's leg.

20. The navigation board of claim 18 wherein the first attachment means comprises an elastic strap member adapted to be coupled to the bottom surface of the board member around the rider's leg.

21. The navigation board of claim 18 further comprising navigation aid retaining means coupled to the board means for securing the navigational aid supported on the board means.

22. The navigation board of claim 21 wherein the navigational aid, retaining means includes a clamping member for holding the navigation aid.

23. The navigation board of claim 21 wherein the navigational aid retaining means comprises a retaining member, secured to the board means, for retaining a navigational aid in book form open to a selected page.

24. The navigation board of claim 18 further comprising angle adjusting means coupled to the board means for adjusting the angle of the navigation board and supported navigational aid relative to the rider, when the board means is attached to the steering mechanism.

25. The navigation board of claim 18 wherein the first and second strap means each include a flexible strap and a buckle.

26. The navigation board of claim 25 wherein each strap proximate one end is secured to the bottom surface of the board means and securing one end of the buckle and the free end of the strap is wound partially around one of the respective portions of the steering member, through the other end of the buckle and reverses direction around the respective portion of the steering member and is then removably secured to the bottom surface of the board means.

* * * * *